United States Patent
Huber et al.

(10) Patent No.: US 10,050,488 B2
(45) Date of Patent: Aug. 14, 2018

(54) SLOT SEALING MATERIAL, SLOT SEAL AND METHOD FOR PRODUCING A SLOT SEAL

(71) Applicant: SIEMENS AKTIENGESELLSCHAFT, München (DE)

(72) Inventors: Juergen Huber, Erlangen (DE); Bernhard Klaussner, Nürnberg (DE); Dieter Schirm, Breitengüssbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 289 days.

(21) Appl. No.: 15/025,070

(22) PCT Filed: Sep. 15, 2014

(86) PCT No.: PCT/EP2014/069581
§ 371 (c)(1),
(2) Date: Mar. 25, 2016

(87) PCT Pub. No.: WO2015/043991
PCT Pub. Date: Apr. 2, 2015

(65) Prior Publication Data
US 2016/0285337 A1    Sep. 29, 2016

(30) Foreign Application Priority Data
Sep. 27, 2013 (DE) .......................... 10 2013 219 485
Nov. 14, 2013 (EP) ..................................... 13192808

(51) Int. Cl.
*H02K 3/48* (2006.01)
*H02K 3/493* (2006.01)
(Continued)

(52) U.S. Cl.
CPC ............... *H02K 3/493* (2013.01); *C08K 3/08* (2013.01); *C08K 3/18* (2013.01); *C08K 3/34* (2013.01);
(Continued)

(58) Field of Classification Search
CPC ...... H02K 3/493; H02K 15/0018; C08K 3/08; C08K 3/34; C08K 7/02
(Continued)

(56) References Cited

U.S. PATENT DOCUMENTS 2,768,153 A    10/1956    Shokal
3,624,032 A    11/1971    Miyashiro et al.
(Continued)

FOREIGN PATENT DOCUMENTS

CN    1065756 A    10/1992
CN    1115772 A    1/1996
(Continued)

OTHER PUBLICATIONS

Machine Translation for CN1829049A Jul. 3, 2018.*

*Primary Examiner* — Hanh Nguyen
(74) *Attorney, Agent, or Firm* — Henry M. Feiereisen LLC

(57) ABSTRACT

The invention relates to a slot sealing material (7) for an electric machine, which for accommodating an electric conductor arrangement (3) comprises at least one slot (2) having a slot opening (5). Said slot sealing material contains a magnetic filler, especially a soft-magnetic filler, and a reaction resin mixture comprising at least one resin component and a curing agent component. To improve the temperature resistance and mechanical strength of the slot sealing material, a dianhydride is used as curing agent component.

24 Claims, 1 Drawing Sheet

(51) Int. Cl.
*H02K 3/30* (2006.01)
*C08K 3/08* (2006.01)
*C08K 3/18* (2006.01)
*C08K 3/34* (2006.01)
*C08K 7/02* (2006.01)
*H02K 15/00* (2006.01)

(52) U.S. Cl.
CPC ............... *C08K 7/02* (2013.01); *H02K 3/30* (2013.01); *H02K 15/0018* (2013.01)

(58) Field of Classification Search
USPC ..................................... 310/214, 43; 29/596
See application file for complete search history.

(56) References Cited

U.S. PATENT DOCUMENTS

| | | | | |
|---|---|---|---|---|
| 4,204,181 | A | * | 5/1980 | Smith ................. C08G 59/226 310/208 |
| 5,605,763 | A | * | 2/1997 | Yusa .......................... C08J 5/18 156/306.6 |
| 2009/0023843 | A1 | | 1/2009 | Beisele |
| 2009/0127494 | A1 | | 5/2009 | Kanekiyo et al. |
| 2014/0163139 | A1 | * | 6/2014 | Wang ...................... C08L 63/00 523/435 |

FOREIGN PATENT DOCUMENTS

| | | |
|---|---|---|
| CN | 1829049 A | 9/2006 |
| CN | 101238530 A | 8/2008 |
| DE | 1288186 B | 1/1969 |
| DE | 1299357 B | 7/1969 |
| EP | 1754733 A1 | 2/2007 |
| EP | 2365491 A1 | 9/2011 |
| JP | S5111109 A | 1/1976 |
| JP | S5921245 A | 2/1984 |
| JP | 3051973 U | 9/1998 |
| JP | 3051973 B | 6/2000 |
| RU | 803806 A1 | 4/1994 |
| SU | 1361678 A1 | 12/1987 |
| WO | WO 2006100291 A1 | 9/2006 |

* cited by examiner

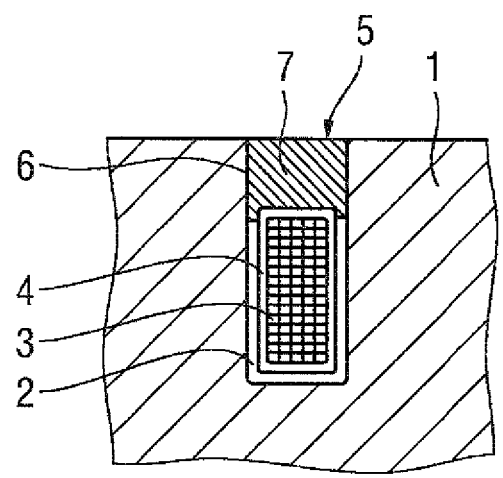

SLOT SEALING MATERIAL, SLOT SEAL AND METHOD FOR PRODUCING A SLOT SEAL

CROSS-REFERENCES TO RELATED APPLICATIONS

This application is the U.S. National Stage of International Application No. PCT/EP2014/069581, filed Sep. 15, 2014, which designated the United States and has been published as International Publication No. WO 2015/043991 and which claims the priorities of German Patent Application, Serial No. 10 2013 219 485.4, filed Sep. 27, 2013, and European Patent Application, Serial No. 13192808.7, filed Nov. 14, 2013, pursuant to 35 U.S.C. 119(a)-(d).

BACKGROUND OF THE INVENTION

The invention relates to a slot sealing material for an electric machine, which for accommodating an electric conductor arrangement comprises at least one slot having a slot opening, containing a magnetic filler, in particular a soft-magnetic filler, and a reaction resin mixture comprising at least a resin component and a curing agent component, which are present separately prior to processing. The invention further relates to a slot seal and a method for producing a slot seal for an electric machine.

The slots of electric machines serve to accommodate insulated electric conductors or conductor arrangements. They generally have a slot opening, via which the conductors or conductor arrangement are inserted into the slot. In particular in the case of high-voltage machines, so-called "open slots" are used, wherein the slot opening extends across the full width of the slot. The slot opening must hence be sealed after insertion of the electric conductor or conductor arrangement, in order to prevent the conductors from rising up out of the slot during operation of the electric machine.

The slot seal for such slot openings is normally executed with solid sealing bodies, known as slot wedges. These slot wedges are e.g. manufactured from technical laminated materials using mechanical processing. Alternatively they can be manufactured from thermoplastic or duroplastic molding compounds using extrusion or injection molding.

To improve the magnetic flux field in the region of the slot opening, the slot seals are in part designed to be soft-magnetic. In this case the slot seals are designed in the form of slot wedges, made of iron-filled laminated materials. Such a soft-magnetic slot seal is however normally bonded to the slot, in order to achieve a good wringing fit. Otherwise there is a risk that the slot wedge will work loose because of the operating stresses (thermal stress, thermomechanical alternating stress, magnetic alternating stress, environmental influences). This bonding can only be reliably executed with considerable effort.

A prefabricated sealing body which is used as a slot seal is described e.g. in WO 2006/100291 A1. The sealing body in this case consists of a material with a thermoplastic polymer material and a magnetic filler.

Another form of soft-magnetic slot seal is thermosetting epoxy resins filled with iron powder, as described e.g. in unexamined patent applications DE 1 288 186 and DE 1 299 357. The epoxy resins are pressed into the slot opening as paste-like compounds and are then thermally cured. Such a slot seal is distinguished by a permanent wringing fit compared to the soft-magnetic wedges.

SUMMARY OF THE INVENTION

The object of the invention is to specify an improved, thermosetting, magnetic slot seal.

The object is inventively achieved by a slot sealing material for an electric machine, which has at least one slot with a slot opening for accommodating an electric conductor arrangement, containing:
  a magnetic filler, in particular a soft-magnetic filler, and
  a reaction resin mixture comprising at least a resin component and a curing agent component, wherein the curing agent component contains a dianhydride.

The invention is based on the knowledge that the use of a dianhydride, which is present in particular in powder form, as a curing agent or co-curing agent in the reaction resin mixture significantly improves the temperature resistance and mechanical strength of the slot sealing material. The reaction resin mixture is thus suitable for an application temperature range above 155° C., thus enabling heat classes F to be covered with ease, and where appropriate higher heat classes too. The curing agent component, in this case the dianhydride, has a proportion of approx. 5% to a maximum of 50% by weight of the reaction resin mixture.

The term magnetic filler should here also be understood as a magnetic filler mixture.

The resin component and the curing agent component of the reaction resin mixture are in this case present, initially separately, prior to the processing or production of the slot sealing material, and are in particular mixed with one another immediately prior to placing the slot sealing material into a slot of the electric machine. The resin component and curing agent component, and the magnetic filler, can be blended in any order. It has proven to be particularly advantageous if the magnetic filler is added to the resin component first. The slot sealing material then cures because of the polyaddition taking place in the reaction resin mixture. Since the reaction resin mixture also cures at room temperature the slot sealing material is in particular mixed at the place it is used. It is also conceivable to produce the slot sealing material or at least the reaction resin mixture of the slot sealing material a few hours before it is applied in the slot opening.

Preferably a 3,3',4,4'-benzophenonetetracarboxylic dianhydride (CAS 2421-28-5) and/or pyromellitic dianhydride (CAS 89-32-7) and/or 3,3',4,4'-biphenyltetracarboxylic dianhydride (CAS 2420-87-3) is used as a dianhydride in the reaction resin mixture.

Expediently the resin component of the reaction resin mixture is an epoxy resin. The epoxy resin then reacts with the dianhydride so as to form a reaction resin molded material.

Since the dianhydride and anhydrides generally absorb moisture in the reaction resin mixture over time, the slot sealing material advantageously contains a desiccant, in particular a zeolith, in order to prevent or at least minimize the water absorption by the reaction resin mixture.

According to a preferred variant of the embodiment the slot sealing material moreover contains organic and/or inorganic nanoparticles, in particular core shell nanoparticles or inorganic nanoparticles based on $SiO_2$. The nanoparticles in particular improve the flow behavior of the reaction resin mixture and the impact resistance of the cured slot seal.

According to another preferred variant of the embodiment the slot sealing material has a glass transition temperature which is equal to or greater than 200° C. This is advantageous, because when the glass transition temperature is exceeded this brings about a distinct change in the mechanical and electrical properties. To permit the use of the slot seal at as high temperatures as possible, a glass transition temperature of 200° C. or more is set by a suitable composition of the slot sealing material.

In respect of a high magnetic permeability of the slot seal, provision is made for the proportion of the magnetic filler or magnetic filler mixture in the slot sealing material preferably to be at least 85% by weight.

In addition a higher proportion of the magnetic filler is achieved, in that the magnetic filler is advantageously present in the form of bimodal to multimodal particle size distributions. This means that the magnetic filler has at least two particle size distributions, wherein the smaller particles in particular fill the spaces between the larger particles. In this way as high a packing density as possible is created, which in turn results in high permeability. The magnetic filler contains an iron powder, in particular a sponge iron powder or a carbonyl iron powder. The iron powder has an average particle size of between approx. 40 and 500 μm, in particular of approx. 200 μm to 300 μm. However, in principle particle sizes of less than 40 μm or more than 500 μm are possible.

It is further advantageous for the slot seal material to contain fibrous fillers with a fiber length of between 50 μm and 10000 μm, in particular between 100 μm and 5000 μm, in particular between 100 μm and 3000 μm. Such fibrous fillers bring about an increase in mechanical strength. Inorganic fibers such as glass fibers or also organic fibers such as aramid fibers are used as fibrous fillers. Moreover any fiber mixtures are also possible.

The object is further inventively achieved by a slot seal of an electric machine made of a slot seal material according to one of the embodiments described above.

The object is moreover inventively achieved by a method for producing a slot seal for an electric machine, which has at least one slot with a slot opening for accommodating an electric conductor arrangement, wherein:
- a slot sealing material is produced from at least one resin component and a curing agent component containing a dianhydride, which are mixed to form a reaction resin mixture, and from a magnetic filler, in particular a soft-magnetic filler, and
- to seal the slot opening the slot sealing material is placed into the slot after the placement of the conductor arrangement.

To accelerate curing of the slot sealing material the slot sealing material is preferably heat-treated after being placed in the slot, wherein the heat treatment takes place at 70° C. to 250° c., in particular at 120° C. to 160° C.

The advantages and preferred embodiments already cited in relation to the slot sealing material can be transferred to the method for producing a slot seal accordingly.

BRIEF DESCRIPTION OF THE DRAWING

An exemplary embodiment of the invention is explained in greater detail with reference to a drawing. In this, the single FIGURE shows an exemplary embodiment of a stator of an electric machine with a magnetic slot seal.

DETAILED DESCRIPTION OF PREFERRED EMBODIMENTS

The FIGURE shows a partial cross-section of an exemplary embodiment of a stator 1 of an electric machine. The stator 1 comprises a slot 2, in which an electric conductor arrangement 3 is placed. The conductor arrangement 3, shown only schematically, can be designed as an electric single conductor or else as a combination of several electric subconductors. It is surrounded by an electrical insulation 4 and is part of a coil winding of the stator 1. In principle the slot 2 and the conductor arrangement 3 can also be provided in a rotor of the electric machine instead of in the stator 1.

A slot seal 6 is arranged in the region of a slot opening 5 inside the slot 2. The slot seal is formed from a slot seal material 7 which contains a soft-magnetic filler and a reaction resin mixture. The reaction resin mixture is composed at least of a resin component, in the exemplary embodiment shown an epoxy resin, and a curing agent component, which in this case contains a dianhydride in powder form, such as e.g. CAS 2421-28-5. The slot sealing material 7 can moreover contain a zeolith as a desiccant, organic and/or inorganic nanoparticles and fibrous fillers.

The proportion of the magnetic filler in the slot sealing material 7 is at least 85% by weight. The proportion of the dianhydride in the reaction resin mixture is between 5% and 50%. The components of the slot sealing material 7 or at least the components of the reaction resin mixture are in particular mixed together immediately before they are placed into the slot opening 5. After the slot sealing material 7 is placed in the slot opening 5 it is heated in particular to over 120° C., which means the polyaddition reaction in the slot sealing material is accelerated, so that the slot sealing material 7 is cured to form the slot seal 6.

A slot sealing material 7 produced in this way is characterized by a high chemical resistance, by a high temperature resistance and mechanical strength, by high magnetic permeability because of the high proportion of magnetic filler, and by good adhesion to the slot sides even at an increased temperature when the electric machine is in use. Because of its composition the slot sealing material 7 in particular has a glass transition temperature higher than 200° C. The area of application of the slot seal 6 lies in heat class F or higher, i.e. during operation of the electric machine a temperature of in particular 155° C. may be reached and where necessary exceeded.

What is claimed is:

1. A slot sealing material for a slot of an electric machine to accommodate an electric conductor arrangement, said slot sealing material comprising:
    a magnetic filler;
    a reaction resin mixture comprising at least a resin component and a curing agent component, said curing agent component containing a dianhydride; and
    a zeolith as a desiccant.

2. The slot sealing material of claim 1, wherein the magnetic filler is a soft-magnetic filler.

3. The slot sealing material of claim 1, wherein the dianhydride is at least one composition selected from the group consisting of 3,3',4,4'-benzophenonetetracarboxylic dianhydride (CAS 2421-28-5), pyromellitic dianhydride (CAS 89-32-7), and 3,3',4,4'-biphenyl tetracarboxylic dianhydride (CAS 2420-87-3).

4. The slot sealing material of claim 1, wherein the curing agent component is an epoxy resin.

5. The slot sealing material of claim 1, further comprising organic and/or inorganic nanoparticles in order to improve a flow behavior of the reaction resin mixture and an impact resistance.

6. The slot sealing material of claim 1, having a glass transition temperature equal to or greater than 200° C.

7. The slot sealing material of claim 1, wherein the magnetic filler is contained at a proportion of at least 85% by weight.

8. The slot sealing material of claim 1, wherein the magnetic filler is present in the form of bimodal to multimodal particle size distributions.

9. The slot sealing material of claim 1, further comprising fibrous fillers having a fiber length of between 50 µm and 10000 µm.

10. The slot sealing material of claim 1, further comprising fibrous fillers having a fiber length of between 100 µm and 3000 µm.

11. A slot seal for sealing a slot in an electric machine, said slot seal comprising a slot sealing material comprising a magnetic filler, a reaction resin mixture comprising at least a resin component and a curing agent component, said curing agent component containing a dianhydride, and a zeolith as a desiccant.

12. The slot seal of claim 11, wherein the magnetic filler is a soft-magnetic filler.

13. The slot seal of claim 11, wherein the dianhydride is at least one composition selected from the group consisting of 3,3',4,4'-benzophenonetetracarboxylic dianhydride (CAS 2421-28-5), pyromellitic dianhydride (CAS 89-32-7), and 3,3',4,4'-biphenyl tetracarboxylic dianhydride (CAS 2420-87-3).

14. The slot seal of claim 11, wherein the curing agent component is an epoxy resin.

15. The slot seal of claim 11, wherein the slot sealing material comprises organic and/or inorganic nanoparticles in order to improve a flow behavior of the reaction resin mixture and an impact resistance.

16. The slot seal of claim 11, having a glass transition temperature equal to or greater than 200° C.

17. The slot seal of claim 11, wherein the magnetic filler is contained at a proportion of at least 85% by weight.

18. The slot seal of claim 11, wherein the magnetic filler is present in the form of bimodal to multimodal particle size distributions.

19. The slot seal of claim 11, wherein the slot sealing material comprises fibrous fillers having a fiber length of between 50 µm and 10000 µm.

20. The slot seal of claim 11, wherein the slot sealing material comprises fibrous fillers having a fiber length of between 100 µm and 3000 µm.

21. A method, comprising:
mixing at least one resin component and a curing agent component containing a dianhydride to form a reaction resin mixture;
combining the reaction resin mixture with a magnetic filler, and a zeolith as a desiccant to produce a slot sealing material;
placing an electric conductor arrangement in a slot of an electric machine; and
sealing a slot opening of the slot by placing the slot sealing material into the slot.

22. The method of claim 21, further comprising heat-treating the slot sealing material, after being placed into the slot, at a temperature of 70° C. to 250° C.

23. The method of claim 21, wherein the magnetic filler is a soft magnetic filler.

24. The method of claim 21, further comprising heat-treating the slot sealing material, after being placed into the slot, at a temperature of 120° C. to 160° C.

* * * * *